United States Patent

[11] 3,612,492

[72] Inventor Constant Johan Nauta
Overveen, Netherlands
[21] Appl. No. 12,317
[22] Filed Feb. 18, 1970
[45] Patented Oct. 12, 1971
[73] Assignee Nautamix Patent A.G.
Zug, Switzerland
[32] Priority Feb. 21, 1969
[33] Netherlands
[31] 69,02737

[54] DEVICE FOR MIXING, KNEADING OR DRYING SUBSTANCES
12 Claims, 1 Drawing Fig.
[52] U.S. Cl. .................................................. 259/102
[51] Int. Cl. .................................................. B01f 7/00
[50] Field of Search .......................................... 259/102,
5–8, 16, 21–24, 32–34, 40–44, 64–67, 99, 30, 105,
40

[56] References Cited
UNITED STATES PATENTS
3,450,390 6/1969 Nauta ........................... 259/102

Primary Examiner—Jordan Franklin
Assistant Examiner—Geo. V. Larkin
Attorney—Arnold Robinson ABSTRACT: A device for mixing, kneading or drying substances includes one mixing screw which extends substantially along the longitudinal length of the inner surface of a frustoconical vessel in which it is mounted. A second mixing screw which is supported and driven from its upper end is also mounted in the vessel. The lower end of the second mixing screw is unsupported and spaced from the bottom of the vessel at a location in or close to the axis of symmetry of the vessel.

PATENTED OCT 12 1971 3,612,492
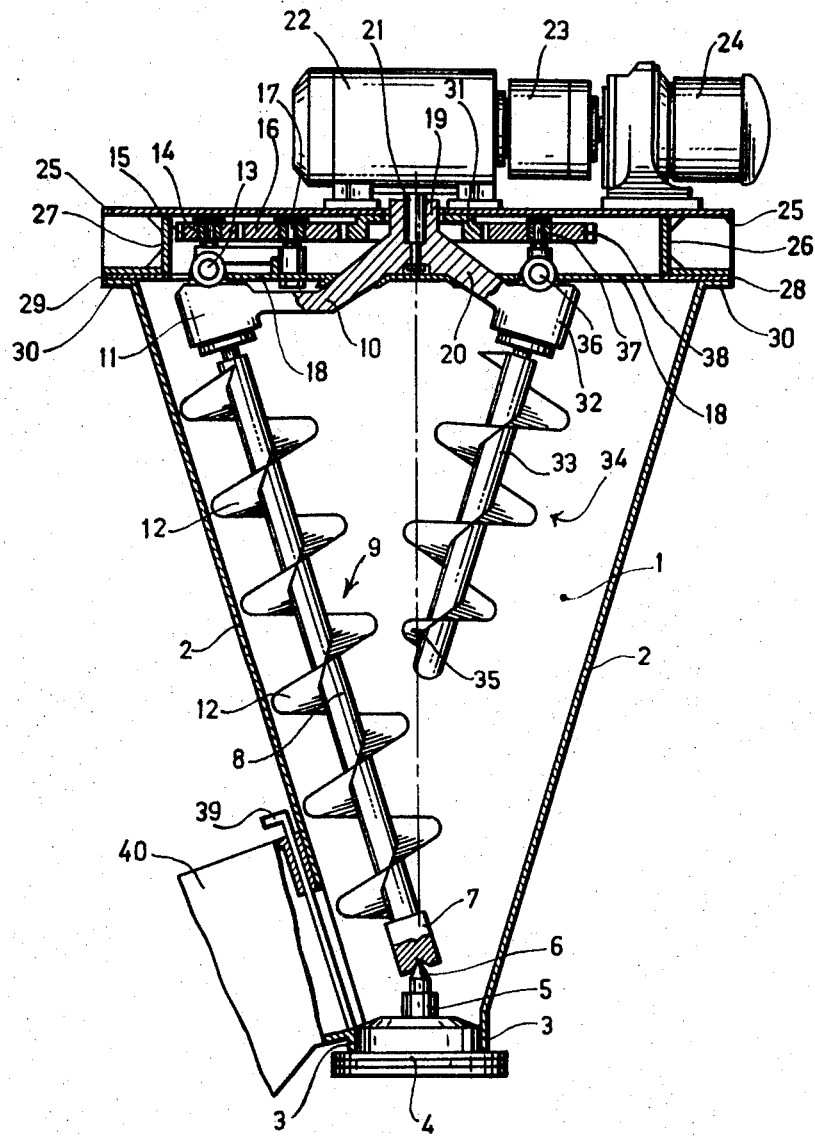

DEVICE FOR MIXING, KNEADING OR DRYING SUBSTANCES

The invention relates to a device for mixing, kneading or drying substances and includes at least one vessel having an inverted, frustoconical configuration with a vertical axis of symmetry. The device of the present invention includes a stirring member disposed in the vessel directly adjacent to the latter's internal peripheral surface, a driven support means including an arm supporting said stirring member at its upper end in such a manner that said stirring member is rotatable about its own axis relative to said support means for which it depends, the support means being rotatably secured to mounting means to be rotatable together with said stirring member about the vertical axis of symmetry of said vessel, and drive means arranged to rotate said support arm and said stirring member as aforesaid.

One aspect of the present invention to improve known devices so that better mixing results will be obtained, in particular, when treating exceptional and difficult mixtures of substances showing the so-called floating effect. Therefore, the device according to the present invention is characterized in that a second stirring member is disposed in the vessel, the above-mentioned support means being arranged to support the upper end of said second stirring member at a location spaced from the internal peripheral surface of the vessel in such a manner that the second stirring member is rotatable about its own axis relative to the support means from which it depends. The support means is mounted as stated above so that the support means and the second stirring member are rotatable together about the vertical axis of symmetry of the vessel. The unsupported lower end of the second stirring member is accommodated in or close to the axis of symmetry of the vessel at a distance spaced from the bottom of the vessel, the drive means rotating said support means and the second stirring member simultaneously.

According to another aspect of the present invention, the support body for the upper end of the shaft of the second stirring member is disposed along the driven support arm for the first-mentioned stirring member at a location between the support body for the first stirring member and the means supporting the driven support arm and arranged centrally in the vessel of the mixing device. The second stirring member is mounted and arranged so that in operation, the second stirring member remains free of the first stirring member.

According to still another aspect of the present invention the support body supporting the upper end of the second stirring member is disposed on a second driven arm, said arm being shorter than the driven arm supporting the first-mentioned stirring member, and either extending directly from said latter arm or making an angle with said latter arm, both of said driven arms extending from one support body arranged rotatably and centrally in the vessel.

In order that the invention may be clearly understood, reference will now be made by way of example to the accompanying drawing, which is a vertical section through a device constructed according to one embodiment of the invention.

The illustrated device comprises a mixing vessel I of an inverted, frustoconical shape. The sidewall 2 of the vessel has at its lower end a short cylindrical section 3. A bottom element 4 is secured to said cylindrical section 3. A bearing element 5 is mounted on the bottom element 4. A pin 6 on said bearing element 5 supports the lower end 7 of the shaft 8 of a mixing screw 9. The upper end of the shaft 8 is supported rotatably in the outer support body 11 of a radially extending driven supporting arm 10. The shaft 8 of the mixing screw 9 is disposed in the vessel 1 parallel to the sidewall 2 of said vessel, the screw blade 12 of the said mixing screw 9 transporting the material to be treated in a zone directly bordering the sidewall 2. The support body 11 has a universal joint 13 joining the shaft 8 with a drive shaft 14. The latter is provided with a gearwheel 15 fixed on the shaft 14 and meshing with a gearwheel 16 rotatably supported on a pin 17. The pin 17 is fixed on a plate 18 secured to a supporting body 19 forming the central part of the first supporting arm 10 and a second supporting arm 20.

The supporting body 19 is fixed on an output shaft 21 of a reduction gear 22, said output shaft 21 being disposed in the axis of symmetry of the vessel 1. The input shaft (not shown) of the reduction gear 22 is connected via an interposed coupling 23 to the shaft of an electric motor 24. The reduction gear 22 and the electric motor 24 are carried by a supporting plate 25 provided across the open top of the vessel 1. The supporting plate 25 is supported on an upper flange 30 of the sidewall 2 by means of profilated bars 26 and 27, platelike elements 28 and 29 being interposed between said bars 26 and 27, respectively, and the flange 30. An externally toothed ring 31 is fixed on the underside of the supporting plate 25, the previously mentioned gearwheel 16 meshing with said ring 31.

The second supporting arm 20 is provided with an outer support body 32 rotatably supporting the upper end of the shaft 33 of a mixing screw 34. The shaft 33 of the mixing screw 34 is supported only at its upper end, its unsupported lower end 35 being accommodated in or close to the axis of symmetry of the vessel 1, spaced at a considerable distance from the bottom element 4 of said vessel. The support body 32 has a universal joint 36 joining the shaft 33 of the mixing screw 34 with a drive shaft 37 which is provided with a gearwheel 38 fixed on the shaft 37 and also meshing with the externally toothed ring 31.

A discharge aperture is arranged in the sidewall 2 of the vessel 1, which aperture is adapted to be closed by a slide 39 movable in guides secured to the outer side of the sidewall 2 and which enables a bag 40 to be fastened temporarily to the outlet means.

In operation, the central supporting body 19 together with the supporting arms 10 and 20 are rotated from above about the vertical axis of symmetry of the vessel by the electric motor 24. Consequently, in operation, the mixing screws 9 and 34 also rotate about said axis of symmetry. Simultaneously, the mixing screw 9, via the universal joint 13 and the gearwheels 15 and 16, and the mixing screw 34, via the universal joint 36 and the gearwheel 38, rotate about the longitudinal axes of their own shafts as the gearwheels 16 and 38 mesh with and orbit about the stationary externally toothed ring 31. Obviously the proper mixing results are achieved by means of the mixing screw 9 extending to nearly the full inside height of the mixing vessel 1 and treating the substances in a zone directly bordering the sidewall 2 of said vessel, whereas the mixing screw 34 is operable to substantially check the floating effect of the substances to be treated achieving at the same time mixing results in a smaller zone bordering the upper part of the vertical axis of symmetry of the vessel 1.

If desired, the device may include more than one vessel, while the relationship of the mixing screws in respect of one another, the shape of the mixing members and the type of drive means may be varied from those shown.

The advantages of the present invention, as well as certain changes and modifications of the disclosed embodiments thereof, will be readily apparent to those skilled in the art. It is the applicant's intention to cover all those changes and modifications which could be made to the embodiments of the invention herein chosen for the purposes of the disclosure without departing from the spirit and scope of the invention.

What is claimed is:

1. A device for mixing, kneading or drying substances, comprising:
   1. at least one vessel having an inverted, frustoconical shape and having a vertical axis of symmetry;
   2. a first stirring member disposed in said vessel adjacent to its internal peripheral surface;
   3. a second stirring member disposed in said vessel, spaced from the internal surface of said vessel and being unsupported at its lower end which extends in proximity to said axis of symmetry of said vessel at a location spaced from the bottom the said vessel;

4. support means disposed along and rotatable about said vertical axis of symmetry of said vessel, said first and second stirring members being rotatably supported by said support means;
5. drive means operative to rotate said first and second stirring members with respect to said support means while rotating said support means about said vertical axis of symmetry of said vessel; and
6. mounting means disposed across the open top of said vessel for mounting said support means and said drive means.

2. The device according to claim 1 wherein said support means comprises:
 1. a central support body;
 2. at least one support arm radially extending from said central support body; and
 3. at least one outer support body disposed on said arm remote from said central support body.

3. The device according to claim 1 wherein said support means comprises:
 1. a central support body;
 2. first and second arms extending radially from said central support body, said second arm being shorter than said first arm; and
 3. first and second outer support bodies disposed on said first and second arms, respectively, for rotatably mounting said first and second stirring members, respectively.

4. The device according to claim 3 wherein said first arm comprises:
 1. a first portion extending from said first outer support body toward said axis of symmetry of said vessel substantially perpendicular thereto; and
 2. a second portion extending from said first portion to said central support body and forming an included angle of less than 180° with said first portion.

5. The device according to claim 3 wherein said second arm extends from said central support body at substantially the same angle as said second portion of said first arm.

6. The device according to claim 3 wherein said first and second arms are disposed at angles of 180° with respect to one another.

7. The device according to claim 3 wherein said drive means comprises:
 1. first and second universal joints mounted on said first and second outer support bodies, respectively, and mechanically connected to said first and second stirring members, respectively;
 2. first and second orbiting gear means connected to said first and second universal joints, respectively;
 3. stationary gear means disposed about said axis of symmetry of said vessel and engaging said first and second orbital gear means; and
 4. a source of mechanical power operative to cause said drive means to rotate about said axis of symmetry of said vessel and thereby cause said first and second stirring members to rotate with respect to said first and second outer support bodies, respectively.

8. The device according to claim 5 wherein said source of mechanical power comprises:
 1. a reduction gear having an output shaft disposed along said axis of symmetry of said vessel and connected to said central support body of said support means, and having an input shaft;
 2. an electric motor having an output shaft; and
 3. coupling means operative to connect said output shaft of said motor and said input shaft of said reduction gear.

9. The device according to claim 1 wherein said mounting means comprises:
 1. a supporting plate;
 2. proliferated bars extending downward from said supporting plate; and
 3. platelike elements interposed between said proliferated bars and a flange extending radially outward from the open top of said vessel.

10. The device according to claim 1 wherein said vessel includes:
 1. a cylindrical section at the bottom thereof;
 2. a bottom element secured in said cylindrical section; and
 3. a bearing element mounted on said bottom element and operative to support said first stirring member.

11. The device according to claim 10 wherein said bearing element comprises a pin, and said first stirring member includes a shaft having a lower end which is in engagement with said pin.

12. The device according to claim 1 wherein said vessel includes a sidewall portion having a discharge aperture therein near the bottom of said vessel, and slide means movably engaging guide means and operative to open or close said discharge aperture.